US010088890B1

(12) United States Patent
Ehrhardt

(10) Patent No.: US 10,088,890 B1
(45) Date of Patent: Oct. 2, 2018

(54) MANAGING MESSAGE DELIVERY

(71) Applicant: Amazon Technologies, Inc., Reno, NV (US)

(72) Inventor: John Randall Ehrhardt, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 418 days.

(21) Appl. No.: 14/230,470

(22) Filed: Mar. 31, 2014

(51) Int. Cl.
*H04L 29/08* (2006.01)
*G06F 1/32* (2006.01)
*H04L 12/58* (2006.01)

(52) U.S. Cl.
CPC ............ *G06F 1/3287* (2013.01); *H04L 51/06* (2013.01); *H04L 67/145* (2013.01)

(58) Field of Classification Search
CPC .................................................. H04L 67/145
USPC ......................................................... 709/206
See application file for complete search history.

(56) References Cited

U.S. PATENT DOCUMENTS

| 8,612,534 | B1* | 12/2013 | Hossack | ................. | H04L 51/04 709/206 |
| 2012/0284297 | A1* | 11/2012 | Aguera-Arcas | ....... | G06F 21/629 707/769 |
| 2013/0115980 | A1* | 5/2013 | Papakipos | ............. | H04W 4/206 455/466 |
| 2013/0344859 | A1* | 12/2013 | Abramson | ........... | G06Q 50/265 455/418 |

* cited by examiner

*Primary Examiner* — Suraj Joshi
(74) *Attorney, Agent, or Firm* — Lowenstein Sandler LLP

(57) ABSTRACT

Embodiments of methods, systems, and storage medium associated with selective content delivery to a client device are disclosed herein. In one instance, the method may include sending by a computing device a lock mode signal to a messaging service hosted by a second computing device, that the computing device has entered a notification lock mode of operation that restricts the computing device from receiving at least some messages from the messaging service; and maintaining a communications connection between the computing device and the messaging service during the notification lock mode of operation of the computing device despite severing a logical connection between the messaging service and an application operating on the computing device. The logical connection was used to enable the message delivery from the messaging service to the application. Other embodiments may be described and/or claimed.

16 Claims, 6 Drawing Sheets

MANAGING MESSAGE DELIVERY

BACKGROUND

Many client computing devices today host multiple applications, depending on user's needs, tastes, and preferences. Some of these applications, such as instant messaging, email, social media, and others may include providing content to users or facilitating communications between the users. The content or communications are often delivered to the client computing devices, through a messaging service. Examples of content may include notifications about messages from other users or services, weather or traffic reports, stock quotes, news alerts, and the like. The messaging services may reside on servers located remotely from the serviced client devices. In some instances, the messaging services may be configured to deliver content in a "push" fashion.

In some instances, e.g., following a period of inactivity, a client device may enter a lock mode of operation, in which at least some of the device functionalities may become inaccessible in order to conserve battery life and/or processing power. While the screen is off, the client device may receive messages, such as emails, social media notifications and telephone calls, which may cause the device to become operational to notify the user of the received message. Receiving messages require resources, which need battery power. Embodiments discussed herein can solve a number of problems, including improving battery life of mobile devices that receive messages.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
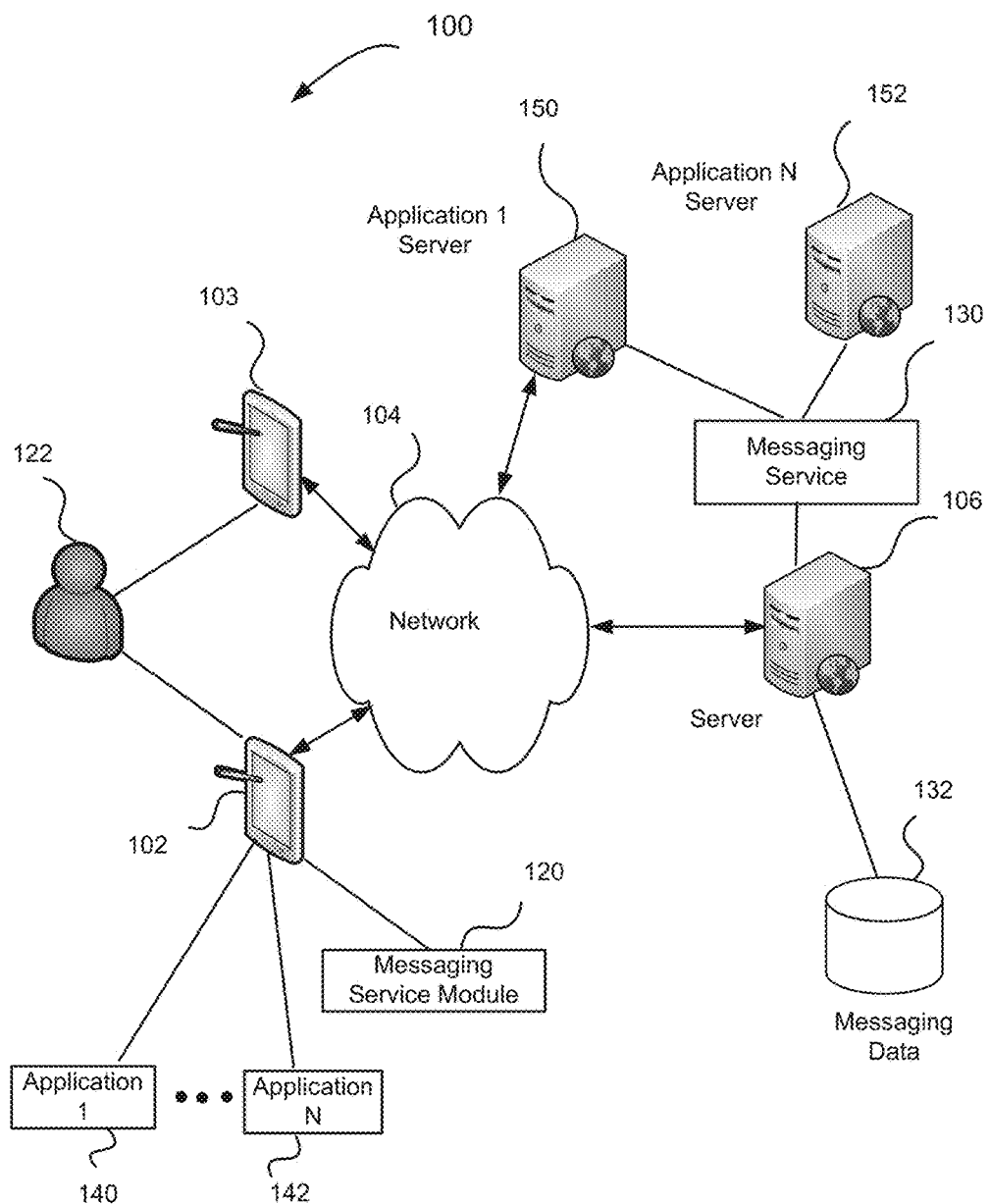
FIG. 1 is a block diagram illustrating an example computer system configured to facilitate message delivery to client computing devices, in accordance with various embodiments.

Techniques for selective push-mode content delivery by a messaging service to applications residing on a client computing device are described herein. Push-mode content delivery includes, for example, providing notifications to the client computing device according to a particular configuration as soon as the message becomes available for communication to the client device, without the client device having to request the message's delivery. A logical connection over a physical connection between the client device and a remote computing device may be used to provide the push notifications. The logical connection may be a path to a client device for a specific application running on the client device (e.g., such as an operation system's notification service or type of application operated by the client device's hardware). The physical connection may be, for example, a transfer control protocol (TCP) connection that is shared by multiple applications and/or used by a specific application. Pull notifications may also utilize one or more of the same or different logical connections, where pull notifications are sent in response to the client device querying the server to determine whether the server has any notifications to send the client device.

In some embodiments, the client computing device may be configured to determine, based on indications provided by at least one of the applications or by a user, which applications to maintain logical connections with the messaging service. A remote computing device (e.g., server) may house the messaging service. During a period of inactivity, e.g., while the client computing device is in a notification lock mode, the remote computing device may be configured to refrain from sending the client computing device messages or otherwise providing services. In some instances, the remote computing device may sever one or more logical connections with the client computing device based on the client computing device providing information to the messaging service about the applications whose logical connections with the messaging service are to be maintained/severed. Severing (de-establishing) the logical connection may include the client device no longer listen or otherwise ignore messages that might be sent on that logical connection (e.g., client device would not route messages received on the physical connection). Severing the logical connection might also or instead include that the remote computing device operate as disconnected from the client device and no longer push messages associated with one or more applications down the physical connection (communications connection) associated with the logical connection.

In some embodiments, when one or more logical connections are severed, the client device and other aspects of the system may stay in push mode, such as when another application may have a valid logical connection associated with the real physical (communications) connection (the TCP/HTTPS/Websocket) for message delivery. The client device may exit push mode and go into deep sleep when there are no applications with logical connections (e.g., because all have been severed) when the client device enters notification lock mode.

When the client computing device enters a mode of operation other than regular (active) mode, such as the notification lock mode, the client computing device may inform the messaging service that the device has entered the notification lock mode. The messaging service may commence a selective delivery of content (e.g., messages, notifications, and the like) to those applications whose logical connections with the messaging service are maintained during the notification lock mode of operation. The logical connections with other applications may be de-established, and message delivery to these applications suspended, to reduce consumption of power, and save battery life of the client computing device during the notification lock mode of operation. If no applications residing on the client computing device are determined to maintain their logical connections with the messaging service during the notification lock mode of operation, the client computing device or the server may determine to de-establish a communications connection between the server and client computing device that enables logical connections, in order to further conserve power and battery life of the client computing device during the notification lock mode.

In some embodiments, the client computing device may enable (e.g., prompt) the user of to determine, for at least some applications, whether the applications are to maintain or de-establish their logical connections with the messaging service during the notification lock mode of operation of the client computing device. Accordingly, the message delivery to some applications during the notification lock mode may be configured according to user preferences. In other words, the user may choose to maintain or reduce message delivery frequency, or stop the message delivery for different application during the notification lock mode according to her preferences.

For example, the user may choose, for a particular application (e.g., an online game, email service, voice-over-internet protocol service or the like), to be able to receive messages or notifications during a notification lock mode of her smart phone, and turn off message or notification receipt for the same application during the notification lock mode of her tablet computer, thus conserving battery life of the tablet computer. In another example, the user may choose to override a default near-instant message delivery configuration for an application residing on her device during the notification lock mode. In yet another example the user may choose to receive messages during the notification lock mode once during a determined period of time, e.g., once a day, once a week, or the like.

FIG. 1 is a block diagram illustrating an example computer system 100 configured to manage selective message delivery to client computing devices, in accordance with various embodiments. Although a network-based (e.g., Web-based) computer system is used for purposes of explanation, different computer systems may be used, as appropriate, to implement various embodiments.

The computer system 100 may include one or more client computing devices 102, 103 which may include any appropriate device, such as, in some embodiments, a mobile wireless device, an e-book reader, a tablet, a laptop computer, a wearable device, or a console, among other possibilities. For purposes of simplicity, the client computing device 102 may be configured to facilitate selective message receipt, described herein below in further detail. However, it will be appreciated that the computer system 100 may be configured to deliver messages to the device 103 and/or a plurality of other client computing devices configured similarly to device 102, in accordance with embodiments described herein.

The client computing device 102 may be configured to host one or more applications 140, 142 executable on the client computing device 102. The applications 140, 142 may include applications configured to enable communications between a user 122 of the client computing device 102 and other users or services, such as electronic mail, instant messaging, online games, social media, and the like. The computing device 102 may host a messaging service module 120 configured to facilitate transmission and receipt of content (e.g., messages) for the applications 140, 142. The messaging service module 120 may operate in concert with a messaging service 130 as described below.

The messaging service 130 may be configured to perform communication services for applications, including content (e.g., message) transmission from, and delivery to the applications residing on the computing device 102. Example of content or messages that may be delivered by the messaging service 130 include, but are not limited to, news alerts, stock quotes, weather information, traffic reports, game moves, email messages, notification of events such as email arrival, chat room messages, instant messages, and the like.

In some embodiments, the messaging service 130 may be hosted on and executed by a messaging server 106. The messaging server may include messaging service components facilitating message exchanges between the messaging service 130 and the client computing devices, such as the messaging service module 120. The messaging server 106 may be located remotely from the client computing device 102.

In some embodiments, the messaging service 130 operated by the messaging service 106 may be configured to perform message delivery to the client computing device in a push mode. More specifically, the messaging service 130 may deliver content (e.g., messages) to the applications residing on the client computing device 102 according to user profile preferences or application specifications, for example, as soon as the messages appear on the server 106, without a request from the client computing device 102.

In some embodiments, communications between the computing device 102 and the messaging server 106 may be conducted via a network 104. The network 104 may include any appropriate network, including an intranet, the Internet, a cellular network, a wide area, local or personal area network, portion of which is wired or wireless (e.g., Bluetooth®, near field communication (NFC), or Wi-Fi) or any other such network or combination thereof. The messaging service 130 may be configured to perform message delivery to applications 140, 142 operating on the client computing device 102 over logical connections established between the respective applications and the messaging service 130, facilitated by the messaging service module 120. The logical connections may be implemented over a communications connection between the client computing device 102 and the messaging server 106. For example, the communications connection between the client computing device 102 and the messaging server 106 may be established over the network 104.

The content (e.g., messages) to be delivered to the applications 140, 142 may be generated or otherwise provided by respective application servers 150, 152 via the messaging service 130. The application servers 150, 152 may host the application services that provide respective applications 140, 142. For example, the application server 150 may be configured to provide email service via the corresponding email application 140 residing on the client computing device and other email applications similar to 140 that may reside on other user devices (not shown). Communications between the other user devices, the application servers 150, 152, and the messaging server 106 operating the messaging service may be carried out over one or more networks similar to ones described in reference to network 104, not shown in FIG. 4 for simplicity purposes.

In some embodiments, the client computing device 102 may be configured to have multiple modes of operation. The modes of operation may include a regular mode, in which the client computing device is fully operational, for example, has network access (e.g., not in airplane mode), and has its hardware and software resources operational without any logical connections being severed by one or more service providers based on the operating state of the client computing device 102. The modes of operation may further include a notification lock mode, in which at least some of the notification functionalities may become de-established (severed) by a remote device configured to provide one or more services to the client computing device 102 that may include notification service, thereby making the service(s) inaccessible to the user.

In some embodiments, some components of the client computing device 102 may be placed in a lower power consumption mode, to conserve battery life. For example, in addition to locking a keyboard, a display screen of the client computing device 102 may be locked and dimmed. The notification lock mode may occur during one or more of the above described modes that include lower power consumption. The client computing device 102 may be configured to enter the notification lock mode, in response to a user instruction, or automatically, after a particular time period of inactivity. For example, when a display screen of the client computing device 102 is locked or turned off, the client computing device 102 may enter the notification lock mode. In another example, the user may initiate a notification lock mode on the client computing device 102, e.g., with the user input (e.g., selecting a corresponding selectable element on the user interface).

In some instances, the messaging service module 120 may be configured to notify message service 130 of the client computing device 102 entering a notification lock mode. Such notification, e.g., a notification lock signal, may be sent each time the client computing device enters the notification lock mode. In some instances, a notification of entry in notification lock mode may be made after the client computing device 102 has entered into notification lock mode for a period of time, or after the running average between notification lock and unlock time periods falls below a threshold.

In some embodiments, the messaging service 106 and the messaging service module 120 may be configured to selectively deliver messages to the applications 140, 142 during the notification lock mode of operation of the client computing device 102, based on user preferences, application configurations, or the like, in response to having been notified of the client computing device 102 having entered the notification lock mode of operation. For example, the messaging service 106 and the messaging service module 120 may be configured to reduce the frequency of message delivery to the client computing device 102 or stop the message delivery altogether. The reduction of message delivery frequency may result in reduction of the frequency of the client computing device 102 being "woken up" (e.g., re-entering regular mode of operation) caused by a receipt of messages of little interest to the user, thereby contributing to the reduction of battery power usage, and conservation of battery life. The messaging service 130 may be made aware of what applications reside on the client computing device 102, and which of these applications may be configured to receive messages (or conversely refrain from receiving messages during notification lock mode, as described below in greater detail.

In some embodiments, in lieu of the messaging service 130 having knowledge of the applications on the client computing device 102, and their attributes, the messaging service module 120, in addition to notifying message service 130 of the client computing device 102 having entered the notification lock mode of operation, may be configured to determine to maintain a logical connection between the application 140 during the notification lock mode of operation of the computing device. Such determination may occur, for example, in response to a request from the application 140 to maintain the logical connection during the notification lock mode. Such determination may also occur in response to detecting an attribute (an indicator or a flag such as a data string of a particular value, or the like) of the application 140 that may specify maintenance of the logical connection during the notification lock mode.

In another example, such determination may occur in response to user input associated with the request to maintain the logical connection (e.g., user approval to maintain the logical connection). For example, the messaging service module 120 may be configured to prompt the user 122 of the client computing device 102 to approve, deny, or change the request to maintain (or de-establish) the logical connection between the application 140 and the messaging service 130 during the notification lock mode of operation of the client computing device 102.

In some embodiments, the messaging service 130 may be configured to accumulate data about the applications residing on associated client computing devices (e.g., 102, 103) that are to maintain their logical connections with the messaging service 130 in order to deliver messages during the notification lock mode of the respective client computing devices. For example, the message delivery data may be accumulated in the data repository 132 that may be accessible by the messaging service 130.

The messaging service module 120 may notify the messaging service 130 that the logical connection between determined applications (e.g., the application 140) and the messaging service 130 be maintained during the notification lock mode of operation of the client computing device 102. The maintained logical connection may enable the message delivery to the application 140 by the messaging service 130 during the notification lock mode of operation of the client computing device 102.

As described above, the client computing device 102 may determine (e.g., detect) that the device entered a notification lock mode of operation and notify the messaging service 130 (e.g., via the messaging service module 120) that the client computing device 102 has entered the notification lock mode of operation. In response, the messaging service 130 may deliver messages to those of the applications residing on the computing device that have their logical connections with the messaging service maintained during the notification lock mode of operation of the computing device. For example, the messaging service 130 may continue delivering messages to the application 140 over the logical connection maintained during the notification lock mode of operation of the client computing device 102.

The messaging service module 120 may determine to de-establish a logical connection between other applications residing on the client computing device 102 (e.g., the application 142) and the messaging service 130. This determination may be based, for example, on an absence of a request from the application 142 to maintain the logical connection during the notification lock mode, or in response to detecting an attribute of the application 142 specifying de-establishment of the logical connection during the notification lock mode of operation of the client computing device 102. In some embodiments, the messaging service module 120 may be configured to prompt the user 122 of the client computing device 102 to approve, deny, or change the de-establishment of the logical connection between the application 142 and the messaging service 130. The messaging service module 120 may notify the messaging service 130 that the logical connection between the application 142 and the messaging service 130 be de-established during the notification lock mode of operation of the client computing device 102.

In general, at least some of the applications 140, 142 residing on the client computing device 102 may be configured to enable requesting of maintaining or de-establishing logical connections with the messaging service 130. At least some of these applications may be configured to allow user adjustment (e.g., user input providing approval or denial) of maintenance or de-establishment of the logical connections. For example, different instances of the application 140 may reside on the client computing devices 102, 103 accessible by the user 122. In some embodiments, each instance of the application 140 may allow the user 122 to adjust a request to maintain or de-establish the logical connections during the notification lock mode of operation of the client computing devices 102, 103, according to user preferences for each respective device. For example, the user 122 may choose to de-establish the logical connection between the application 140 and the messaging service 130 during the notification lock mode of operation of the client computing device 102 for a particular period of time.

In some embodiments, the application 140 may allow the user 122 to adjust the request to maintain (or de-establish) the logical connections during the notification lock mode of operation of the client computing devices 102, 103 in a uniform fashion, irrespective of the device on which the instance of the application 140 resides. For example, the user 122 may be able to either approve the maintenance of the logical connections between the instances of the applications 140 residing on devices 102, 103 or deny the maintenance of the logical connections between the instances of the applications 140 residing on devices 102, 103 during the notification lock mode of operations of these devices.

More generally, some applications may or may not allow the user input regarding the maintenance or de-establishment of the logical connection. Some applications may be configured to disallow requests for logical connection maintenance or de-establishment. For example, applications providing instant messaging service may be configured to always maintain the logical connection with the messaging service 130 during the notification lock mode of operation of the client computing device 102.

In summary, the messaging service 130 may be configured to selectively deliver messages to those of the applications residing on the client computing devices serviced by the messaging service 130 that have their logical connections with the messaging service maintained during the notification lock mode of operation of the computing devices. The selective delivery of messages may be based on information (e.g., requests to maintain or de-establish logical connections) known to messaging service 130 and/or provided by the messaging service module 120 on the client computing devices. The operation of the messaging service 130 and the messaging service module 120 will be described in greater detail in reference to FIGS. 2-5.

Figure 2:
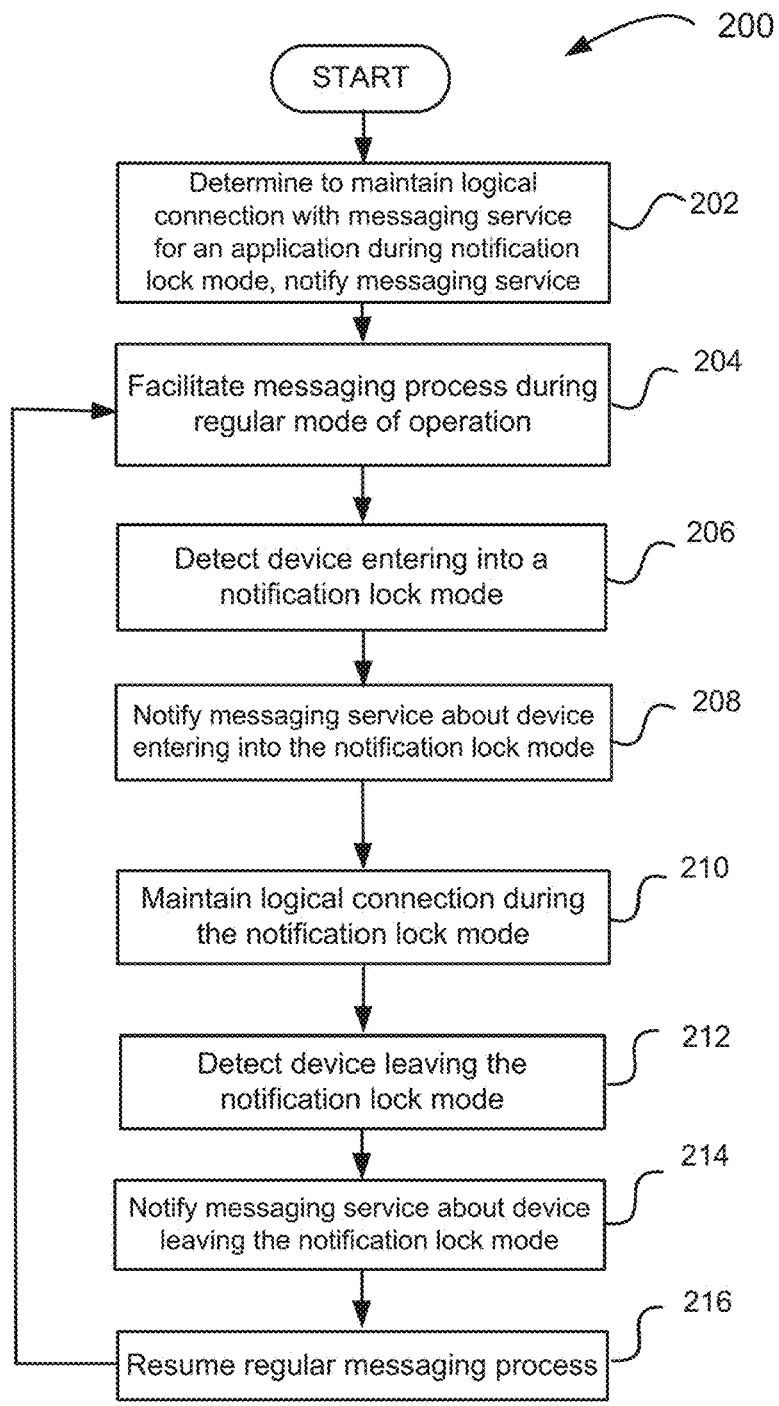
FIG. 2 is a process flow diagram illustrating an example process for managing message receipt on a client computing device, in accordance with some embodiments.

FIG. 2 is a process flow diagram illustrating an example process 200 for managing message receipt on a computing device, in accordance with some embodiments. The process 200 may be performed, for example, by the messaging service module 120 executing on the client computing device 102 as described in reference to FIG. 1.

The process 200 may begin at block 202, where the messaging service module 120 may determine to maintain logical connection with the messaging service 130 for an application (e.g., 140) residing on a computing device (e.g., 102) during a notification lock mode of operation. The determination may be based on a request from the application 140 to maintain the logical connection during the notification lock mode, or on a detection of an attribute of the application 140 that may specify maintenance of the logical connection during the notification lock mode. The determination may be also based on user input associated with the request to maintain the logical connection (e.g., user approval to maintain the logical connection).

The messaging service module 120 may provide notification to the messaging service 130 that the logical connection between the application 140 and the messaging service 130 be maintained during the notification lock mode of operation of the client computing device 102.

At block 204, the messaging service module 120 may, in conjunction with the messaging service 130, facilitate the messaging, such as message delivery to the client computing device 102 in a regular mode of operation of the device 102.

At block 206, the messaging service module 120 may detect or otherwise determine that the client computing device 102 has entered into a notification lock mode of operation. For example, the operating system of the client computing device 102 may be configured to provide an indication to the messaging service module 120 that the client computing device 102 has entered or about to enter the notification lock mode.

At block 208, the messaging service module 120 may notify the messaging service 130 that the client computing device 102 has entered or about to enter the notification lock mode.

At block 210, the messaging service module 120 may cause the client computing device 102 to maintain the logical connection between the application 140 and the messaging service 130 during the notification lock mode. For example, the messaging service module 120 may cause the application layer of a communication protocol operative on the client computing device 102 to maintain the logical connection between the application 140 and the messaging service 130 during the notification lock mode.

At block 212, the messaging service module 120 may detect that the client computing device has left the notification lock mode of operation, e.g., resumed the regular mode of operation. At block 214, the messaging service module 120 may notify the messaging service 130 about the client computing device 102 leaving the notification lock mode. For example, the messaging service module 120 may send an unlock signal to the messaging service 130. At block 216, messaging service module 120 may resume facilitation of the messaging process, e.g., for a regular mode of operation of the client computing device 102. The process 200 may return to block 204.

It will be appreciated that the operations discussed in reference to FIG. 2 may not need to be performed in the sequence described. Some of the operations may precede others or may be performed substantially simultaneously with others. For example, notifying the messaging service 130 that the logical connection between the application 140 and the messaging service 130 be maintained during the notification lock mode of operation may occur in connection with informing the messaging service 130 that the client computing device 102 has entered the notification lock mode of operation. In another example, the operations described in blocks 202, 204 may be performed after, or in conjunction with, the operation described in reference to block 206.

Figure 3:
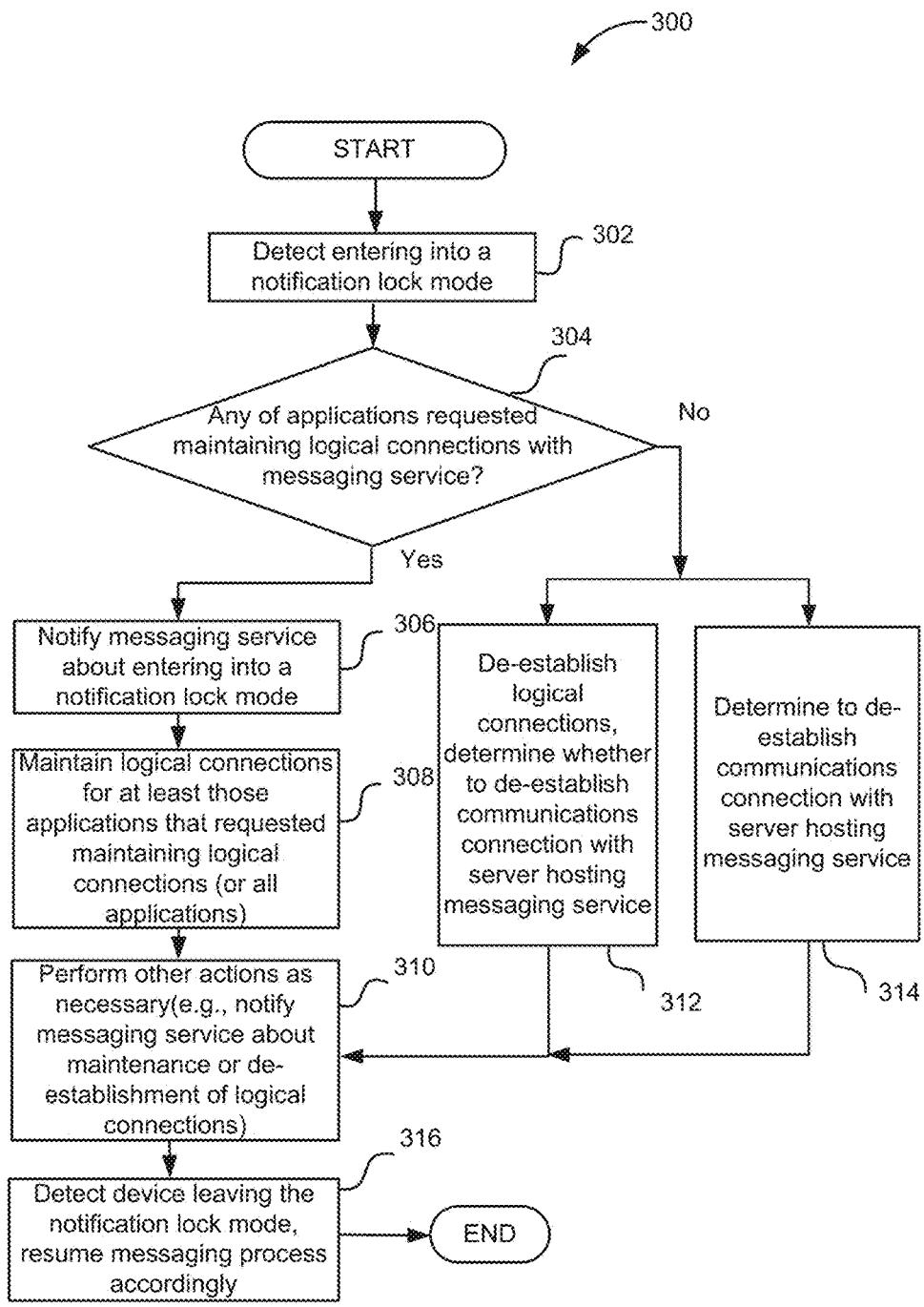
FIG. 3 is a process flow diagram illustrating some aspects of an example process for managing message receipt on a client computing device, in accordance with some embodiments.

FIG. 3 is a process flow diagram illustrating some aspects of an example process 300 for managing message receipt on a computing device, in accordance with some embodiments.

The process 300 may be performed, for example, by the messaging service module 120 executing on the client computing device 102 as described in reference to FIG. 1.

The process 300 may begin at block 302, where the messaging service module 120 may detect or otherwise determine that the client computing device 102 has entered into a notification lock mode of operation, as described in reference to FIG. 2.

At decision block 304, the messaging service module 120 may determine whether any of applications residing on the computing device 102 requested maintaining logical connections with the messaging service 130. As described above, the determination may be based on receiving requests from the applications to maintain their logical connections during the notification lock mode, or detecting the attribute of the application specifying maintenance of the logical connection during the notification lock mode.

In some embodiments, such determination may occur, for each application, at (e.g., about the time of) installation of the application. For example, the application 140, at or around the time of installation on the client computing device 102, may provide a request to the messaging service module 120 that the logical connection with the messaging service 130 be maintained during a notification lock mode of operation of the client computing device 102. Information regarding the logical connection maintenance may be accumulated by the messaging service module 120 and stored on the client computing device 102, and/or provided to the messaging service 130 for storage and access as described in reference to FIGS. 1 and 2. The determination at block 304 may also occur before the operation of block 302, e.g., before the client computing device 102 has entered the notification lock mode.

If at block 304 the messaging service module 120 determines that one or more applications are to maintain their logical connections with the messaging service 130 during the notification lock mode, at block 306 the messaging service module 120 may notify the messaging service 130 that the client computing device 102 has entered or about to enter the notification lock mode.

At block 308, the messaging service module 120 may maintain logical connections for at least those applications that requested maintaining logical connections during the notification lock mode, as described in reference to FIG. 2. In some instances, if at least one application requested to maintain the logical connection, the messaging service module 120 may determine to maintain logical connections for all applications that are configured to use the messaging service, because the communications connection with the server hosting messaging service may be maintained if at least one application requests to maintain the logical connection during the notification lock mode.

At block 310, the messaging service module 120 may perform other operations as necessary. For example, the messaging service module 120 may notify the messaging service 130 about maintenance or de-establishment of logical connections with respective applications. In some embodiments, notifying the messaging service 130 that the logical connection between the application and the messaging service be maintained during the notification lock mode of operation occurs in connection with informing the messaging service 130 that the computing device has entered the notification lock mode of operation (block 304).

If the messaging service module 120 determined at block 304 that there are no applications that are to maintain their logical connections with the messaging service 130, the process 300 may move to block 312 or block 314 as described below. At block 312 the messaging service module 120 may de-establish logical connections for those applications that did not request maintaining logical connections. The messaging service module 120 may determine whether to de-establish communications connection between the client computing device 102 and the server 106 hosting the messaging service 130. For example, if no message delivery is expected during the notification lock mode, it may be determined that there is no need to maintain the communications connection (e.g., over the network 104) between the client computing device 102 and the server 106. Accordingly, the messaging service module may request that the computing device 102 de-establish (or request the server 106 to de-establish) the communications connection between the client computing device 102 and the server 106, to conserve battery life of the client computing device 102.

Alternatively, at block 314, the messaging service module 120 may determine to de-establish communications connection between the client computing device 102 and the server 106 hosting the messaging service 130. The process 300 may then move to block 310, at which the messaging service module 120 may perform other operations as necessary, such as notify messaging service 130 about the maintenance or de-establishment of logical and/or communications connections.

At block 316, the messaging service module 120 may detect that the client computing device has left the notification lock mode of operation, e.g., resumed a regular mode of operation. The messaging service module 120 may notify the messaging service 130 about the client computing device 102 leaving the notification lock mode and resume facilitation of the messaging process accordingly, e.g., for a regular mode of operation of the client computing device 102.

Figure 4:
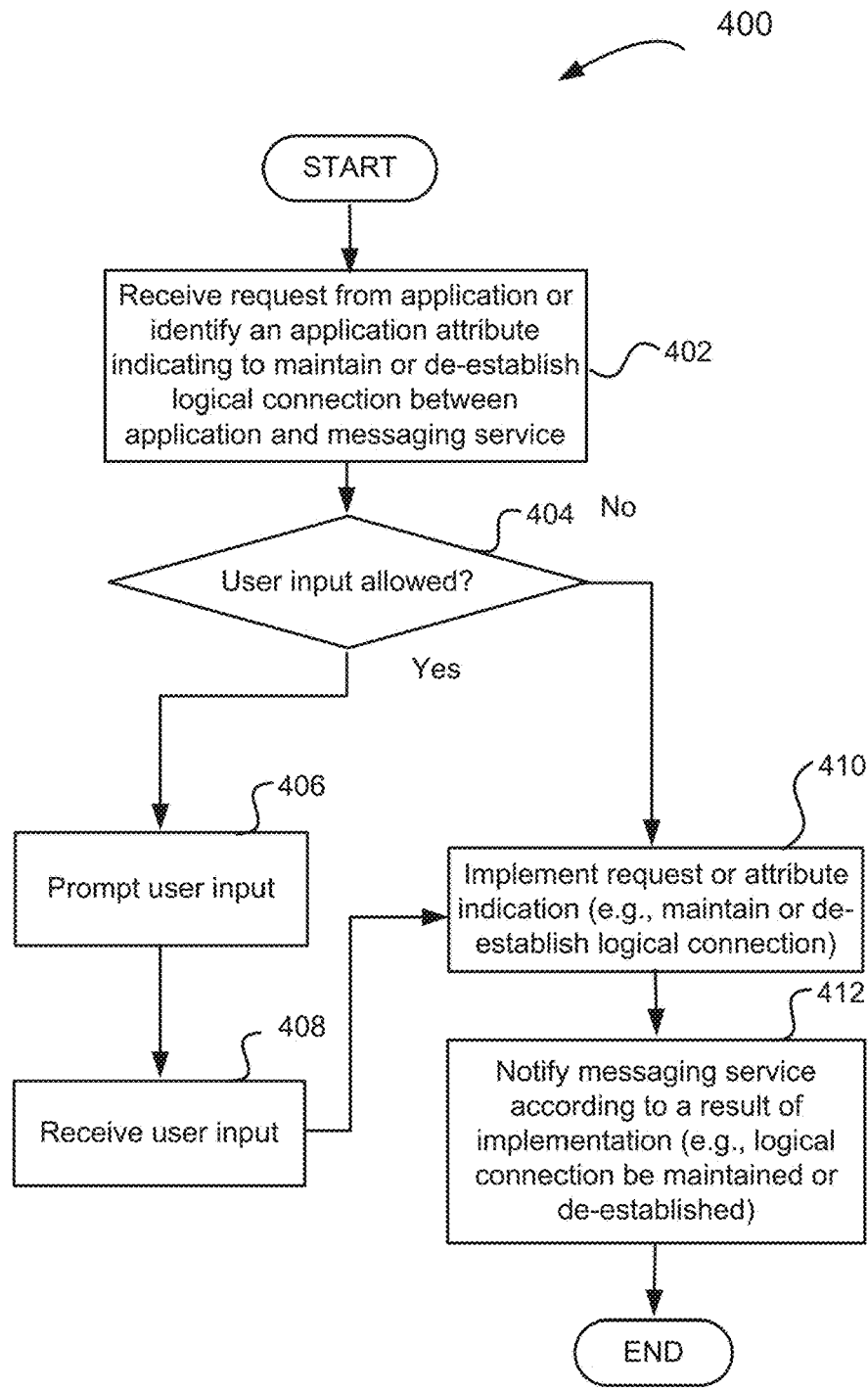
FIG. 4 is another process flow diagram illustrating some aspects of an example process for managing message receipt on a client computing device, in accordance with some embodiments.

FIG. 4 is another process flow diagram illustrating some aspects of an example process 400 for managing message receipt on a computing device, in accordance with some embodiments. The process 400 may be performed, for example, by the messaging service module 120 executing on the client computing device 102 as described in reference to FIG. 1.

The process 400 may begin at block 402, where the messaging service module 120 may receive a request from an application (e.g., 140) to maintain a logical connection between the application 140 and the messaging service 130. In some embodiments, the messaging service module 120 may receive a request from the application 140 to de-establish a logical connection between the application 140 and the messaging service 130. In some embodiments, the messaging service module 120 may identify an attribute (e.g., a flag) associated with the application 140 that indicates that the logical connection between the application 140 and the messaging service 130 be maintained (or de-established).

At decision block 404, the messaging service module 120 may determine whether user input is allowed in relation to the received request or attribute. For example, some applications may be configured to allow user adjustment of the settings or attributes associated with message delivery to the application over a logical connection between the messaging service 130 and the application 140. Accordingly, the user (e.g., 122) of the client computing device (e.g., 102) may choose to receive messages for a particular application, for example, during a notification lock mode of the client computing device. The user 122 may accomplish this by allowing the logical connection between the messaging service 130 and the application 140 be maintained during the notification lock mode of operation of the client computing device 102. Conversely, the user 122 may disallow the logical connection, in order to prevent message delivery to the application 140 during the notification lock mode of the computing device 102.

If at decision block 404 the messaging service module 120 determines that user input is allowed in association with maintenance or de-establishment of the logical connection of the application 140 with the messaging service 130 during the notification lock mode, at block 406 the messaging service module 120 may prompt or otherwise invite user input. For example, the messaging service module 120 may display a prompt (e.g., message) to the user 122 notifying her that the user 120 may be able to input or edit the settings for message delivery to the application 140 by the messaging service 130. For example, the user may be prompted to specify that the messages be delivered (or, conversely not delivered) to the application 140 during the notification lock mode of operation of the client computing device 102.

In another example, the user may choose to reduce the message delivery frequency to the client computing device 102 during the notification lock mode. For example, the user may specify that the messages pertinent to the application 140 are to be received during the notification lock mode once during a determined period of time, e.g., once in a few hours, once a day, once a week, or the like. In yet another example, the user may specify that only particular types of messages (e.g., messages such as emails marked with high importance, messages from particular users, messages having particular word combinations, and the like) may be delivered during the notification lock mode of operation of the client computing device 102. The logical connection may be adjusted accordingly, for example, de-established for a particular period of time during the notification lock mode, or set to be re-established only for particular type message delivery, based upon availability of these special type messages for delivery by the messaging service 130.

At block 408, the messaging service module 120 may receive user input associated with the prompt provided at block 406. The user 122 may provide user input in many different ways, including typing, touch-pointing, selecting selectable elements in the provided prompt (e.g., if the device 102 includes a touch-sensitive screen), and the like. The process 400 may then move to block 410.

If at decision block 404 the messaging service module 120 determines that user input is not allowed in association with maintenance or de-establishment of the logical connection of the application 140 with the messaging service 130 during the notification lock mode, the process 400 may move to block 410.

At block 410, the messaging service module 120 may implement the request received from the application 140 or act in accordance with the attribute identified at block 402, without user input if the process moved from decision block 404. Alternatively, the messaging service module 120 may implement the user input associated with the request or attribute if the process moved from block 406. For example, the messaging service module 120 may determine to maintain (or de-establish) logical connection between the messaging service 130 and the application 140 subsequent to the "No" determination made at decision block 404 or subsequent to the "Yes" determination and operations described in reference to blocks 406 and 408.

At block 412, the messaging service module 120 may notify the messaging service 130 according to block 410 determination, e.g., notify the messaging service 130 that the logical connection be maintained or de-established.

Figure 5:
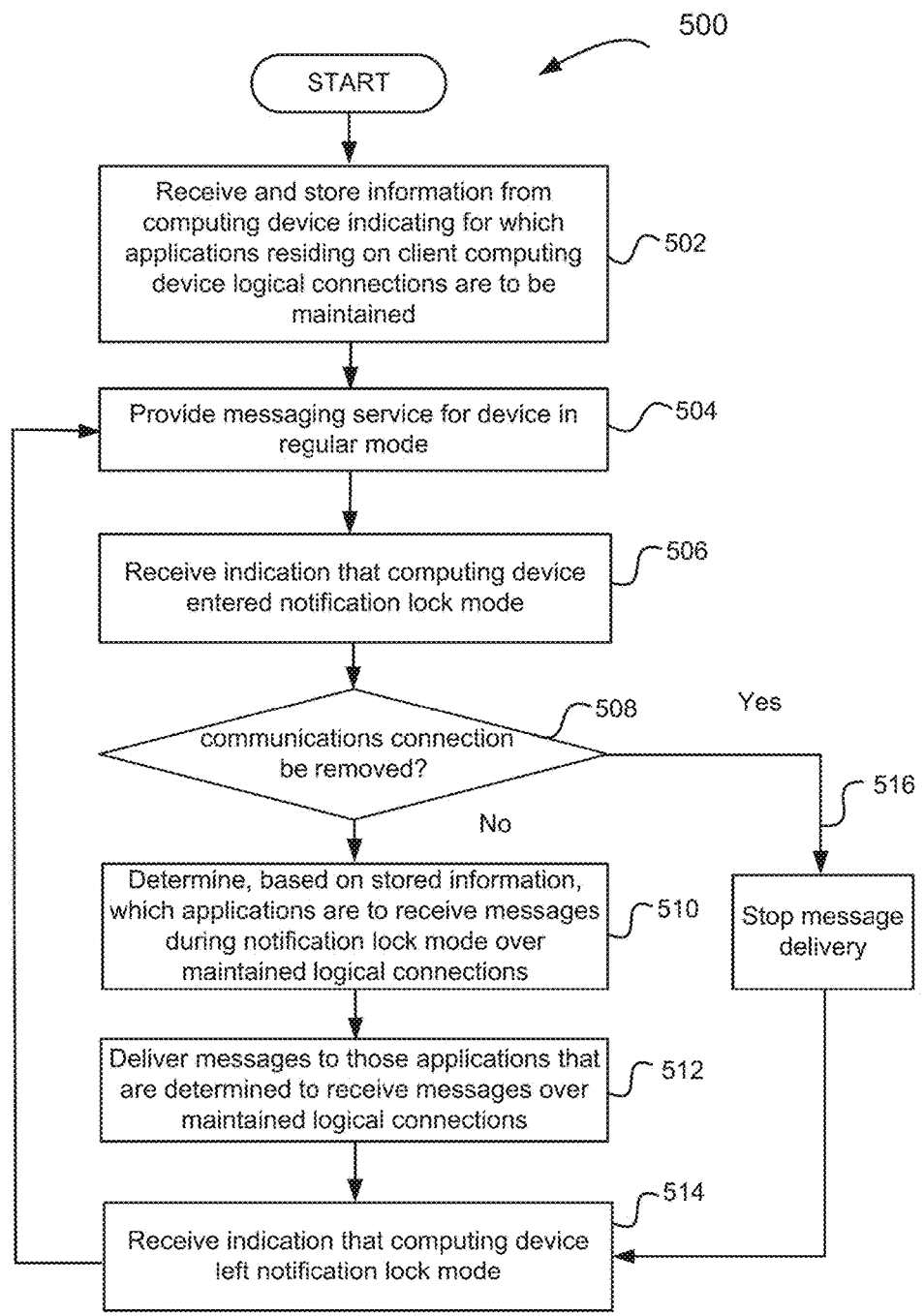
FIG. 5 is a process flow diagram illustrating a process for managing message delivery to a client computing device, on a server computing device, in accordance with some embodiments.

FIG. 5 is a process flow diagram illustrating a process 500 for managing message delivery to a computing device, in accordance with some embodiments. The process 500 may be performed, for example, by the messaging service 130 executing on the server 106 as described in reference to FIG. 1.

At block 502, the messaging service 130 may receive and store information received from a computing device (e.g., client computing device 102) indicating which applications reside on client computing device 102, and for which applications residing on the client computing device logical connections with the messaging service 130 are to be maintained during the notification lock mode of operation of the client computing device 102. As described above, in some embodiments, the messaging service module 120 may accumulate the information on the client computing device 102, store this information, and send or cause it to be sent to the messaging service 130. In some instances, messaging service module 120 may accumulate the information, update the information (e.g., periodically) and send the information to the messaging service 130. In other embodiments, the messaging service 130 may gather and accumulate the information from other sources beside the client computing device 102, e.g., from an application store, and/or application developers/distributors.

In some examples, the messaging service module 120 may determine whether a logical connection is to be maintained for the application being installed (or have been installed) on the client computing device 102 and send this information to the messaging service 130 at or around the time of installation of the application on the client computing device 102. In some embodiments, the messaging service 130 may request periodic updates from the client computing device 102 (e.g., via the messaging service module 120) regarding the applications for which the logical connections are to be maintained during the notification lock mode of operation of the client computing device 102. Generally, the messaging service 130 may obtain the information regarding the applications (e.g., 140) to which the messages are to be delivered over the respective logical connections during the notification lock mode of the respective client computing devices (e.g., 102, 104) serviced by the messaging service 130. As described above, such information may be stored in the data repository 132 accessible by the messaging service 130.

At block 504, the messaging service 130 may provide messaging service for the client computing device 102 in a regular mode, for example, during a regular mode of operation of the client computing device 102.

At block 506, the messaging service 130 may receive an indication from the client computing device 102 that client computing device 102 has entered the notification lock mode of operation.

At decision block 508, the messaging service 130 may determine whether the communications connection with the client computing device 102 be de-established (severed). For example, the client computing device 102 may determine to remove the communications connection with the server 106 operating the messaging service 130. If the messaging service 130 determines that the communications connection is to be removed, the process 500 may move to block 516. At block 516 the messaging service 130 discontinues message delivery to the client computing device 102. The process 500 may move to block 514 described below.

If the messaging service 130 determines that the communications connection is to be maintained, the process 500 may move to block 510. At block 510, the messaging service 130 may determine, based on the information obtained at block 502, which applications are to receive messages during the notification lock mode over the respective maintained logical connections. In the alternative, the determination made in block 510 may occur after the information about the applications message delivery during the notification lock mode is obtained at block 502.

At block 512, the messaging service 130 may deliver messages to those applications on the computing device 102 that are determined to receive messages over the maintained logical connections with the messaging service 130 during the notification lock mode of operation of the client computing device 102.

At block 514, the messaging service 130 may receive indication (e.g., be notified by the client computing device 102) that the client computing device 102 has left the notification lock mode. For example, the client computing device 102 may resume a regular mode of operation. The process 500 may move to block 504, where the messaging service 130 may continue providing messaging service in the regular mode.

Figure 6:
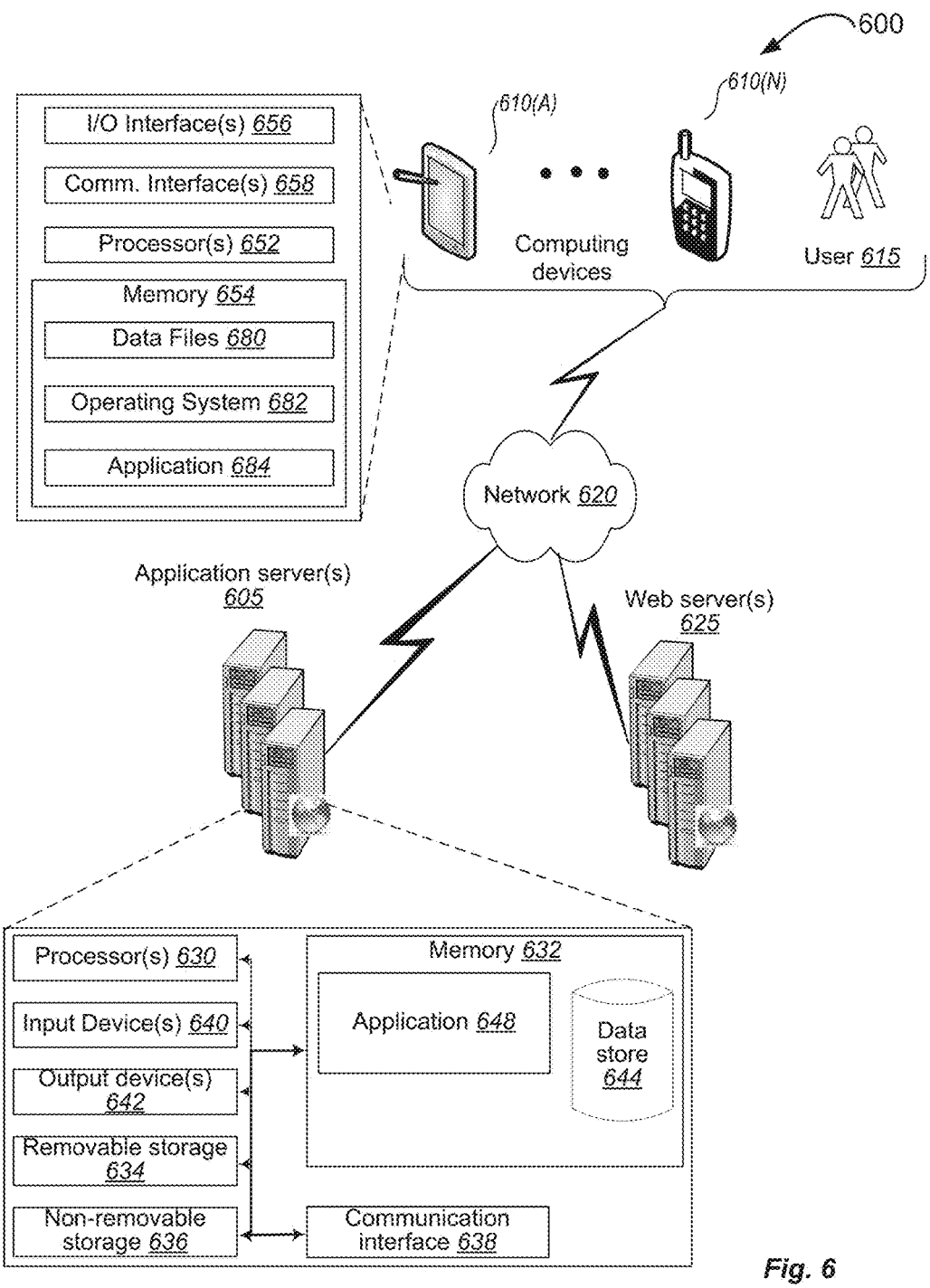
FIG. 6 illustrates an example computing environment in which embodiments described in the present disclosure may be implemented.

FIG. 6 illustrates an example of an illustrative computing environment 600 for implementing aspects in accordance with various embodiments described herein. As will be appreciated, although a Web-based environment is used for purposes of explanation, different environments may be used, as appropriate, to implement various embodiments. The illustrative computing environment 600 may include one or more electronic client computing devices 610(A)-610(N), which may include any appropriate device operable to send and receive requests, messages, or information over an appropriate network 620 and receive information back as described in greater detail in reference to the client computing device 102 of FIG. 1. Examples of such computing devices may include tablet computers, personal computers, smartphones, handheld messaging devices, laptop computers, set-top boxes, personal data assistants, electronic book readers, game consoles, and the like.

The computing devices 610(A)-610(N) may include a processor 652 and memory 654 for storing processor-executable instructions, such as data files 680, operating system 682, and one or more applications 684, such as applications or portions of the applications e.g., applications 140, 142 as described in reference to FIG. 1. The operating system 682 may be a general purpose operating system such as a Microsoft Windows® operating system, a UNIX® operating system, a Linux® operating system, or an operating system specifically written for and tailored to the computing devices 610(A)-610(N).

The computing devices 610(A)-610(N) may further include at least one or both of the following elements: input/output interface 656 and communication interface 658. The communication interface 658 may enable the computing devices 610(A)-810(N) to communicate data, control signals, data requests, and other information with other resources including computers, data sources, storage devices, and the like, on the appropriate computer network 620 such as the Internet, via wired or wireless connections. The input/output interface 656 may enable the computing devices 610(A)-610(N) to obtain data input from a variety of devices including, but not limited to, a digital pen, a touch screen, a keyboard, a mouse, a scanner, and the like. In addition to the illustrative components described above, a display interface (not shown) may be used for outputting display information to a computer user 615. Typically, the display information may be outputted by the display interface via a display device (e.g., a CRT monitor, an LCD screen, a touch screen, a television, an integrated screen or sets of screens, etc.).

The network 620 may include any appropriate network, including an intranet, the Internet, a cellular network, a local area network, a personal network, or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof.

The memory 654 may generally comprise RAM, ROM, and/or other permanent memory. Thus, in addition to storage in read/write memory (RAM), programming instructions may also be embodied in read-only format, such as those found in ROM or other permanent memory.

The illustrative computing environment 600 may include at least one application server 605 including, or associated with, one or more processors 630, input devices 640, output devices 642, removable storage 634, and non-removable storage 636 that may be connected to a communication interface 638 and memory 632. The memory 632 may include, but is not limited to, one or more applications 648, for example, services providing applications 140, 142 and the messaging service 130 referenced in FIG. 1.

The memory 632 may further include a data store 644 configured to store information associated with the stored applications, as needed. As used herein, the term "data store" may refer to any device or combination of devices capable of storing, accessing, and retrieving data, which may include any combination and number of data servers, databases, data storage devices, and data storage media, in any standard, distributed, or clustered environment. It should be understood that there may be many other aspects that may need to be stored in the memory 632, such as user access right information, which may be stored in any of the above-listed mechanisms as appropriate.

The application server 605 may have access to the data store 644 in order to store and retrieve application-related information provided by the client devices 610(A)-610(N) as described in reference to FIGS. 1-5. For example, the data store 644 may store information associated with applications that are configured to receive messages during the notification lock mode of the computing device, similar to that stored in the data repository 132 described in reference to FIG. 1.

The application server 605 may include any appropriate hardware and software for integrating with the data store 644 as needed to execute aspects of one or more applications for the computing devices 610(A)-610(N), handling a majority of the data access and business logic for an application. The application server 605 may provide access control services in cooperation with the data store 644, and may be able to generate content such as text, graphics, audio, and/or video to be transferred to a viewer, which may be served to the viewer by a Web server 625 in the form of HTML, XML, or another appropriate structured language in this example.

Each server 605 or 625 may include an operating system that may provide executable program instructions for the general administration and operation of that server, and may include a computer-readable medium storing instructions that, when executed by a processor (e.g., 630) of the server, may allow the server to perform its intended functions. Suitable implementations for the operating system and general functionality of the servers are known or commercially available, and are readily implemented by persons having ordinary skill in the art, particularly in light of the disclosure herein.

The illustrative computing environment 600 may include a distributed computing environment utilizing several computer systems and components that may be interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the illustrative computing environment 600 in FIG. 6 should be taken as being illustrative in nature, and not limited to the scope of the disclosure.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. A computer-implemented method of managing messages for a computing device, the method comprising:
    operating a first application and a second application on a computing device having a display component;
    establishing, by the computing device, a communications connection between the computing device and a second computing device over a network, the communications connection enabling logical connections on which data is exchanged;
    using, by the computing device, a first logical connection to enable messaging for the first application provided by a messaging service hosted by the second computing device;
    using, by the computing device, a second logical connection to enable messaging for the second application provided by the messaging service hosted by the second computing device;
    detecting, by the computing device, that the computing device entered a notification lock mode of operation that restricts the computing device from receiving at least some notifications;
    sending, by the computing device, to the second computing device, a notification lock signal indicating that the computing device has entered the notification lock mode of operation;
    causing display of a prompt on the display component, the prompt requesting an input to control notifications provided to at least one of the first application or the second application during the notification lock mode of operation;
    receiving the input responsive to the prompt, the input requesting disabling at least some notifications from the messaging service for the first application while the computing device is in the notification lock mode of operation while maintaining messaging for the second application;
    disabling, by the computing device, the messaging service for the first application to prevent the first application from receiving messages from the messaging service; and
    maintaining, by the computing device, messaging using the second logical connection between the second application and the messaging service to allow the second application to continue receiving messages from the messaging service during the notification lock mode of operation.

2. The computer-implemented method of claim 1, further comprising:
    determining, by the computing device, that the computing device exited the notification lock mode of operation;
    sending, by the computing device, an unlock signal to the messaging service indicating the computing device has exited the notification lock mode of operation; and
    receiving, by the computing device, messages for the first application from the messaging service.

3. A computer-implemented method of managing messages for a computing device, the method comprising:
    sending, by the computing device, a lock mode signal to a messaging service hosted by a second computing device, the lock mode signal to indicate that the computing device has entered a notification lock mode of operation that restricts the computing device from receiving at least some messages from the messaging service;
    maintaining, by the computing device, a communications connection between the computing device and the messaging service during the notification lock mode of operation of the computing device;
    causing display of a prompt on the computing device, the prompt requesting an input to control notifications provided to at least one application running on the computing device during the notification lock mode of operation;
    receiving an input from a user interface of the computing device responsive to the prompt, the input requesting disabling at least some notifications from the messaging service for a first application while the computing device is in the notification lock mode of operation while maintaining messaging for a second application;
    disabling the messaging service for the first application to prevent the first application from receiving messages from the messaging service during the notification lock mode of operation; and
    enabling the messaging service for the second application to allow the second application to continue receiving messages from the messaging service during the notification lock mode of operation.

4. The computer-implemented method of claim 3, further comprising:
    detecting, by the computing device, that the computing device entered the notification lock mode of operation.

5. The computer-implemented method of claim 3, further comprising:
    determining, by the computing device, to disable messaging for a third application operating on the computing device, during the notification lock mode.

6. The computer-implemented method of claim 5, further comprising:
    notifying, by the computing device, the messaging service that the messaging service for the third application will be disabled during the notification lock mode of operation of the computing device.

7. The computer-implemented method of claim 5, further comprising:
    notifying, by the computing device, the messaging service that messaging between the second application and the messaging service is to be maintained during the notification lock mode of operation of the computing device, to enable the message delivery to the second application by the messaging service during the notification lock mode of the computing device.

8. The computer-implemented method of claim 7, wherein notifying the messaging service occurs in connection with sending the lock mode signal to the messaging service.

9. The computer-implemented method of claim 8, further comprising:
installing, by the computing device, the second application on the computing device; and
receiving, by the computing device, a request from the second application to maintain a messaging connection during the notification lock mode, or
detecting, by the computing device, an attribute of the second application specifying maintenance of the messaging connection during the lock mode, wherein the detecting or receiving occurs at installation of the second application.

10. The computer-implemented method of claim 7, wherein including notifying the messaging service at installation of the second application that the messaging connection between the second application and the messaging service is to be maintained during the notification lock mode of operation.

11. A computer system for managing messages, the computer system comprising:
at least one processor; and
at least one memory storing processor-executable instructions that, in response to execution by the at least one processor, cause the computer system to provide a messaging service to deliver messages to applications residing on a remote computing device, wherein the messaging service is configured to:
receive a lock mode signal from the computing device indicating that the computing device entered a notification lock mode of operation that restricts the computing device from receiving at least some messages from the messaging service; and
in response to receipt of the lock mode signal, selectively deliver messages to a first application of the applications residing on the computing device having the messaging service maintained during the notification lock mode of operation of the computing device in response to input received for a prompt requesting the input to control notifications provided to at least one application running on the computing device during the notification lock mode of operation, while preventing notification from being delivered to a second application of the application residing on the computing device during the notification lock mode of operation.

12. The computer system of claim 11, wherein the processor-executable instructions further cause the messaging service to:
receive, from the computing device, information indicating which of the applications operating on the computing device are determined to maintain logical connections with the messaging service during the notification lock mode of operation of the computing device.

13. The computer system of claim 11, wherein the processor-executable instructions further cause the computer system, in response to execution on the processor, to receive the information about the applications that are determined to maintain logical connections with the messaging service in connection with the receipt of the lock mode signal.

14. The computer system of claim 11, wherein the processor-executable instructions further cause the computer system, in response to execution on the processor, to receive the information about the applications that are to maintain logical connections with the messaging service in connection with installation of the applications on the computing device.

15. The computer system of claim 11, wherein the processor-executable instructions further cause the messaging service to store information about the applications that are determined to maintain logical connections with the messaging service during the notification lock mode of operation of the computing device, wherein the information is retrievable by the computing system in response to the receipt of the lock mode signal.

16. The computer system of claim 11, wherein the processor-executable instructions further cause the messaging service to:
receive an unlock signal from the computing device indicating that the computing device has exited the lock mode of operation; and
facilitate message delivery to the applications operating on the computing device over the logical connections in a push mode.

* * * * *